Patented June 24, 1947

2,422,887

UNITED STATES PATENT OFFICE 2,422,887

PYRIMIDINE COMPOUND AND PROCESSES FOR MAKING THE SAME

Francis Henry Swinden Curd and Francis Leslie Rose, Blackley, Manchester, England, assignors to Imperial Chemical Industries Limited, a corporation of Great Britain No Drawing. Application September 25, 1944, Serial No. 555,750. In Great Britain September 29, 1943

10 Claims. (Cl. 260—251)

This invention relates to new pyrimidine compounds and to processes for manufacturing the same. The said new compounds, which will be more closely defined hereinafter, may be described broadly as pyrimidines bearing in the 2-position an arylguanidino group, free from acidic substituents, and in the 4-position a strongly basic substituent derived from a diamine which is at least in part aliphatic or alicyclic, and optionally bearing hydrocarbon substituents in the 5- and 6-positions. They are useful as chemotherapeutic agents and have properties such as make them particularly valuable as parasiticidal agents, especially against the malaria parasites.

It is an object of this invention to provide new pyrimidine compounds. A further object is to provide new chemotherapeutic agents. A further object is to provide new and valuable antimalarial agents. Another object is to provide processes for manufacturing new pyrimidine compounds. A further object is to provide processes for making new antimalarial agents. Further objects will appear hereinafter as the description proceeds. These and other objects are achieved by the following invention.

The said new compounds are pyrimidine derivatives of the formula

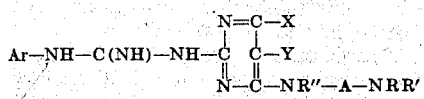

wherein X and Y, which are not necessarily alike, each represent hydrogen or a hydrocarbon radical or X and Y together may represent a divalent aliphatic hydrocarbon radical which forms with the 5- and 6-carbon atoms an alicyclic ring. Ar is an aryl group which may be unsubstitued or may bear one or more simple non-acidic substituents such, for example, as hydrocarbon radicals (which themselves may optionally bear substituents and which may be attached to the aryl group directly or through an oxygen or sulphur atom or through an imino, sulphonyl or carbonyl group), halogen atoms or cyano, nitro amino, acylamino, hydroxyl or esterified carboxyl groups, R'' is hydrogen or an alkyl or simply substituted alkyl group, for example an alkoxyalkyl or dialkylaminoalkyl group, A is a linking group which is aliphatic or alicyclic or aliphatic-carbocyclic and may be substituted, for example, by hydrocarbon radicals, hydroxy or alkoxy groups, or dialkylaminoalkyl groups and, where A or part of A is an aliphatic chain it may be interrupted by oxygen or sulphur atoms or imino groups, and NRR' is a strongly basic amino or substituted amino group such as alkylamino or dialkylamino or piperidino or other strongly basic nitrogen-containing heterocyclic group.

We make the said new compounds by a process comprising the interaction of a diamine NHR''—A—NRR' with an appropriate 2-arylguanidinopyrimidine bearing in the 5- and 6-positions the groups X and Y respectively and in the 4-position a labile group such as a halogen atom or a hydrocarbon radical which is attached by means of an ether or thioether linkage, for example, an alkoxy, aryloxy or alkylmercapto group.

The reaction is conveniently brought about by heating the reagents together, optionally in presence of a solvent or diluent. If desired, the arylguanidinopyrimidine or the diamine may be used in the form of a salt, such as the hydrochloride or acetate. Also if desired the reaction may be carried out in the presence of an acid-binding agent such as sodium hydroxide.

The reagents are conveniently, but not necessarily, used in approximately stoichiometric proportions. Actually we prefer to use about 1.25 molecular proportions of the diamine, but the proportions are not critical and if desired a large excess of the amine may be used so that it functions as a solvent or diluent.

An alternative, modified process, applicable in those cases where the radical NRR' of the diamine represents a primary amino group, is to protect this group, as by acylation, during the condensation with the pyrimidine compound and then subsequently to remove the protecting radical. This process is preferable in many such cases and, as will be appreciated, must be adopted where it is desired to introduce a diamino substituent of the type —N(Alkyl)—A—NH₂, since if the primary amino group is not so protected, reaction with the pyrimidine compound will occur there instead of at the secondary nitrogen atom. The final hydrolysis is performed by known methods, as, for example, by heating the acyl compound with a dilute mineral acid or with a dilute alkali.

The invention therefore includes also a modified process for making those compounds wherein the basic 4-substituent is of the form —NR''—A—NH₂ which comprises the interaction of the pyrimidine intermediate with an acyl derivative of the diamine and subsequent regeneration of the primary amino group by hydrolysis.

The 4 - halogeno - 2 - arylguanidinopyrimidine compounds used as starting materials may be made by reaction of a halogenating agent such as phosphorus oxychloride or oxybromide upon the corresponding 4-hydroxy compounds (themselves produced by interaction of appropriate arylbiguanides and formylacetic esters) as is described in our copending application Ser. No. 555,752. The alternative starting materials containing ether or thioether groups can readily be made by interaction of the 4-halogeno-derivatives with appropriate hydroxy or mercapto compounds or with alkali metal derivatives of such compounds.

As examples of suitable arylguanidinopyrimidine intermediates there may be mentioned, 4 - chloro - 2 - phenylguanidino - 6 - methylpyrimidine,
4 - chloro - 2 - (4' - chlorophenylguanidino) - pyrimidine,
4 - chloro - 2 - (4' - chlorophenylguanidino) - 6 - methylpyrimidine,
4 - chloro - 2 - (4' - methylphenylguanidino) - pyrimidine,
4 - chloro - 2 - (4' - methylphenylguanidino) - 6 - methylpyrimidine,
4 - chloro - 2 - (4' - methoxyphenylguanidino) - 6-methylpyrimidine,
4 - chloro - 2 - (4' - methylmercaptophenyl - guanidino)-6-methylpyrimidine,
4 - chloro - 2 - (3' - chlorophenylguanidino) - 6 - methylpyrimidine,
4 - chloro - 2 - (2' - chlorophenylguanidino) - 6 - methylpyrimidine,
4 - chloro - 2 - (3' - methylphenylguanidino) - 6-methylpyrimidine,
4 - chloro - 2 - (2' - methylphenylguanidino) - 6-methylpyrimidine,
4 - chloro - 2 - (2':4' - dichlorophenylguanidino)-6-methylpyrimidine,
4 - chloro - 2 - (3':4' - dichlorophenylguanidino)-6-methylpyrimidine,
4 - chloro - 2 - (3':5' - dichlorophenylguanidino)-6-methylpyrimidine,
4 - chloro - 2 - (2':5' - dichlorophenylguanidino)-6-methylpyrimidine,
4 - chloro - 2 - (2' - methyl - 4' - chlorophenyl - guanidino)-6-methyl-pyrimidine,
4 - chloro - 2 - (3' - chloro - 4' - methylphenyl - guanidino)-6-methylpyrimidine,
4 - chloro - 2 - (4' - phenyl - phenylguanidino) - 6-methylpyrimidine,
4 - chloro - 2 - (3':4' - dimethylphenylguanidino)-6-methylpyrimidine,
4 - chloro - 2 - (3':5' - dimethylphenylguanidino)-6-methylpyrimidine,
4 - chloro - 2 - (2' - methoxyphenylguanidino) - 6-methylpyrimidine,
4 - chloro - 2 - (3':5' - dibromophenylguanidino)-6-methylpyrimidine,
4 - chloro - 2 - (4' - dimethylaminophenylguanidino)-6-methylpyrimidine,
4 - chloro - 2 - (4' - chlorophenylguanidino) - 6 - phenylpyrimidine,
4 - chloro - 2 - (4' - chlorophenylguanidino) - 5 - phenylpyrimidine,
4 - chloro - 2 - (4' - methoxyphenylguanidino) - 5-phenylpyrimidine,
4 - chloro - 2 - (4 - chlorophenylguanidino) -5 - methylpyrimidine,
4 - chloro - 2 - (4' - chlorophenylguanidino) - 5:6-dimethylpyrimidine,
4 - chloro - 2 - (4' - chlorophenylguanidino) - 5 - ethyl-6-methylpyrimidine,
4 - chloro - 2 - (4' - iodophenylguanidino) - 6 - methylpyrimidine,
4 - chloro - 2 - (4' - fluorophenylguanidino) - 6 - methylpyrimidine,
4 - chloro - 2 - (4' - bromophenylguanidino) - 6 - methylpyrimidine,
4 - chloro - 2(3' - chloro - 5' - methoxyphenyl - guanidino)-6-methylpyrimidine,
4 - chloro - 2 - (2' - naphthylguanidino) - 6 - methylpyrimidine,
4 - chloro - 2 - (6' - bromo - 2' - naphthylguanidino)-6-methylpyrimidine,
4 - chloro - 2 - (6' - methoxy - 2' - naphthyl - guanidino)-6-methylpyrimidine,
4 - chloro - 2 - (1' - naphthylguanidino) - 6 - methylpyrimidine,
4 - chloro - 2 - (4' - chloro - 1' - naphthylguanidino)-6-methylpyrimidine,
4 - chloro - 2 - (4' - ethoxyphenylguanidino) - 6 - methylpyrimidine,
4 - chloro - 2 - (4' - n - butylphenylguanidino) - 6-methylpyrimidine,
4 - chloro - 2 - (4' - carbomethoxyphenylguanidino)-6-methylpyrimidine,
4 - chloro - 2 - (4' - phenyl - phenylguanidino) - 6-methylpyrimidine,
4 - chloro - 2 - (4' - nitrophenylguanidino) - 6 - methylpyrimidine,
4 - chloro - 2 - (4' - cyanophenylguanidino) - 6 - methylpyrimidine,
4 - chloro - 2 - (4' - chlorophenylguanidino) - 5 - benzyl-6-methylpyrimidine,
4 - chloro - 2 - (4' - acetylaminophenylguanidino)-6-methylpyrimidine,
4 - chloro - 2 - (4' - chlorophenylguanidino) - 5:6:7:8-tetrahydroquinazoline,
4 - chloro - 2 - (4' - chlorophenylguanidino) - 5:6-trimethylenepyrimidine,
4 - chloro - 2 - (4' - methylsulphonylphenyl - guanidino)-6-methylpyrimidine, and
4 - chloro - 2 - (4' - dimethylaminosulphonyl - phenylguanidino)-6-methylpyrimidine, and likewise the corresponding 4-bromo, 4-phenoxy, 4-ethoxy, 4-methylmercapto, 4-ethylmercapto and 4-phenylmercapto compounds.

As examples of suitable diamines there may be mentioned ethylenediamine, 2-dimethylaminoethylamine, 3 - dimethylaminopropylamine, N-methyl - N'- diethyl - ethylenediamine, 3 - diethylaminopropylamine, 4 - diethylaminobutyl - amine, 4 - diethylamino - 1 - methylbutylamine, 3 - diethylamino - 1:2 - dimethylpropylamine, 3-diethylamino-2-hydroxypropylamine, 2-methylaminoethylamine, 3 - n - butylaminopropyl - amine, 3-diethylaminoethoxypropylamine, 3-diethylaminoethylmercaptopropylamine, 5-diethylamino - 1 - aminopentane, 2-pyrrolidinoethylamine, 1:3-bis-diethylamino - 2 - aminopropane, N - ethyl - N - β - diethylaminoethyl - ethylenediamine, N - methyl - N - β - diethylaminoethyl - ethylenediamine, 2-pideridinoethylamine, 3-piperidinopropylamine, bis - (β - diethylamino - ethyl) - amine, p - dimethylaminoethoxyaniline, p - diethylaminoethoxyaniline, p - diethylaminoethylmercaptoaniline, 3-diethylamino - 2:2' - dimethylpropylamine, 3-di - n - butylaminopropylamine, N-methyl-N - β - diethylaminoethyl - trimethylenediamine and β-piperdino-α-methylethylamine.

These 2-arylguanidinopyrimidines bearing a basic substituent in the 4-position and optionally bearing hydrocarbon substituents in the 5- and 6-positions are new compounds. They are colourless crystalline solids which are strongly basic and form colourless salts with mineral and organic acids. The salts with mineral acids such as hydrogen halides, sulphuric and phosphoric acids or with lower organic acids such as acetic, lactic, tartaric and lower alkanesulphonic acids (e. g. methane-sulphonic acid) are water-soluble. The salts with acids of higher molecular weight such as methylene bis-2:3-hydroxynaphthoic acid and methylene bis-salicylic acid are more sparingly soluble in water. Those compounds in which the arylguanidino group is a phenylguanidino group substituted in the p-position are particularly useful antimalarial agents.

The following examples illustrate, but do not limit, the invention. The parts are by weight.

*Example 1*

A mixture of 33.4 parts of the hydrochloride of 2-p-chlorophenylguanidino-4-chloro-6-methylpyrimidine and 12.8 parts of β-diethylaminoethylamine is heated at 120–130° C. for 1 hour. The resulting melt is dissolved in 400 parts of hot dilute acetic acid. After cooling, the solution is basified with dilute caustic soda. The base, 2-p-chlorophenylguanidino - 6 - methyl - 4-(β-diethylaminoethylamino)-pyrimidine, is liberated as an oil and solidifies on standing. It is collected, washed with water and dried in vacuo over solid caustic soda. Finally it is recrystallised from petroleum ether (B. P. 100–120° C.) when it forms colourless prisms which melt at 154–155° C. (uncorr.).

It is sparingly soluble in water but forms salts with organic and mineral acids which are freely soluble. For example, the dihydrochloride can be obtained as a dry crystalline powder by evaporating an aqueous solution containing one equivalent of the base with two equivalents of hydrochloric acid, or by adding two equivalents of concentrated hydrochloric acid to a solution of one equivalent of the base in acetone. In the same way the diacetate can be obtained as a colourless crystalline solid by using two equivalents of acetic acid instead of the hydrochloric acid.

*Example 2*

A mixture of 29.8 parts of 2-p-chlorophenylguanidino - 4 - chloro-6 - methylpyrimidine, 17.4 parts of β-diethylaminoethylamine, 250 parts of chlorobenzene, and 200 parts of aqueous caustic soda of 6% strength, is stirred and heated under reflux for 2 hours. The mixture is then distilled in steam to remove the solvent, and the crude 2-p-chlorophenylguanidino-4- (β - diethylaminoethylamino)-6-methylpyrimidine separates out. It is collected, washed with water, dried in vacuo over solid caustic soda and finally recrystallised from petroleum ether. It is identical with the product of Example 1.

*Example 3*

A mixture of 33.4 parts of the hydrochloride of 2-p-chlorophenylguanidino-4-chloro-6-methylpyrimidine, 16 parts of β-diethylaminoethylamine and 16 parts of glacial acetic acid are heated together at 130° C. for 30 minutes. To the viscous solution so obtained 500 parts of water are added and the solution is boiled and filtered from insoluble by-products. The filtrate is added to an excess of dilute caustic soda solution. Crude 2-p-chlorophenylguanidino - 4-β-diethylaminoethylamino-6-methylpyrimidine is precipitated. It is filtered off and purified as described in the preceding examples.

For convenience the following examples are given in abbreviated form. Examples 4–6 are carried out by the method of Example 1, Examples 7–18 by the method of Example 2 and Examples 19–49 as described in Example 3. The data given are (i) the 4-halogeno-2-arylguanidinopyrimidine used as starting material, (ii) the diamine used, which, combined with the halogeno compound yields the end-product indicated (iii). The number of parts listed after each compound is the amount of that compound to be used as starting material in the synthesis. Melting points (uncorrected) of the new compounds formed are given. The 4-halogeno-2-arylguanidino-pyrimidines are in some cases used as the free base and in others (which are indicated) as their hydrochlorides.

*Example 4*

2-p-tolylguanidino-4-chloro-6 - methylpyrimidine, 27.7 parts; γ-diethylaminopropylamine, 22 parts; 2-p-tolylguanidino-4 - γ - diethylamino-6-methylpyrimidine, M. P. 137° C.

*Example 5*

2-(3′:5′-dichlorophenylguanidino) - 4 - chloro-6-methylpyrimidine, 33.4 parts; β-diethylaminoethylamine, 23 parts; 2-(3′:5′-dichlorophenylguanidino ) - 4 - β - diethylaminoethylamino - 6 - methylpyrimidine, M. P. 158°–9.5° C.

*Example 6*

2-β-naphthylguanidino-4-chloro-6 - methylpyrimidine hydrochloride, 34.8 parts; γ-diethylaminopropylamine, 16 parts; 2-β-naphthylguanidino-4-γ-diethylaminopropylamino - 6 - methylpyrimidine, M. P. 130° C.

*Example 7*

2-p-chlorophenylguanidino-4-chloro - 6-methylpyrimidine, 29.8 parts; β-pyrrolidinoethylamine, 16.5 parts; 2-p-chlorophenylguanidino-4-β-pyrrolidinoethylamino-6-methylpyrimidine, M. P. 184°–5° C.

*Example 8*

2 - p - chlorophenylguanidino - 4 - chloro - 6-methylpyrimidine, 29.8 parts; N - ethyl - N - β-diethylaminoethyl-ethylene diamine, 16 parts; 2-p - chlorophenylguanidino -4-β- (N-ethyl-N-β′-diethylaminoethyl) aminoethylamino -6- methylpyrimidine, M. P. 102°–103.5° C.

*Example 9*

2-p-chlorophenylguanidino-4-chloro-6-methylpyrimidine, 29.8 parts; γ-n-butylaminopropylamine, 15 parts; 2-p-chlorophenylguanidino-4-γ-n - butylaminopropylamino-6-methylpyrimidine, M. P. 136°–138° C.

*Example 10*

2 - p - chlorophenylguanidino - 4 - chloro - 6-methylpyrimidine, 29.8 parts; γ - (β′ - diethylaminoethoxy)-propylamine, 32 parts; 2-p-chlorophenylguanidino -4-γ- (β′-diethylaminoethoxy)-propylamino - 6 - methylpyrimidine, M. P. 123°–124° C.

*Example 11*

2 - p - chlorophenylguanidino - 4 - chloro - 6-methylpyrimidine, 29.8 parts; N-methyl-N-β-diethylaminoethyl-trimethylenediamine, 36 parts; 2-p-chlorophenylguanidino -4-γ- (N-methyl-N-β′ - diethylaminoethyl) - aminopropylamino-6-methylpyrimidine, M. P. 119°–120° C.

*Example 12*

2-p-chlorophenylguanidino-4-chloro-6-methylpyrimidine, 29.8 parts; 1:3-bis-diethylamino-2-aminopropane, 30 parts; 2 - p - chlorophenylguanidino -4- (1':3'-bis-diethylaminopropyl-2'-amino) -6-methylpyrimidine, M. P. 110°–112° C.

Example 13

2-p-fluorophenylguanidino-4-chloro-6-methylpyrimidine, 28.1 parts; β-diethylaminoethylamine, 24 parts; 2 - p - fluorophenylguanidino-4-β-diethylaminoethylamino - 6 - methylpyrimidine, M. P. 163°–164° C.

Example 14

2-p-chlorophenylguanidino-4-chloro-6-methylpyrimidine, 29.8 parts; bis - (β-diethylaminoethyl)amine, 40 parts; 2 - p - chlorophenylguanidino -4-bis- (β-diethylaminoethyl)amino-6-methylpyrimidine trihydriodide, M. P. 158°–162° C.

Example 15

2-p-chlorophenylguanidino -4- chloropyrimidine, 24.8 parts; β-diethylaminoethylamine, 16 parts; 2-p-chlorophenylguanidino -4-β- diethylaminoethylaminopyrimidine, M. P. 192° C.

Example 16

2-p-chlorophenylguanidino-4-chloro-5-phenylpyrimidine, 32.4 parts; β-diethylaminoethylamine, 16 parts; 2-p-chlorophenylguanidino-4-β-diethylaminoethylamino-5-phenylpyrimidine.

Example 17

2 - p - chlorophenylguanidino - 4 - chloro-5:6-dimethylpyrimidine, 31.2 parts; β-diethylaminoethylamine, 16 parts; 2-p-chlorophenylguanidino-4 - β - diethylaminoethylamino-5:6-dimethylpyrimidine, M. P. 181°–183° C., as hydrochloride.

Example 18

2-p-chlorophenylguanidino-4-chloro -5- ethyl-6-methylpyrimidine, 32.6 parts; β-diethylaminoethylamine, 16 parts; 2 - p - chlorophenylguanidino-4-β-diethylaminoethylamino -5- ethyl-6-methylpyrimidine, M. P. 125° C., as hydrochloride.

Example 19

2-p-chlorophenylguanidino-4-chloro-6-methylpyrimidine, 29.8 parts; β - dimethyaminoethylamine, 13.5 parts; 2-p-chlorophenylguanidino-4-β-dimethylaminoethylamino -6- methylpyrimidine, M. P. 134° C.

Example 20

2-p-chlorophenylguanidino-4-chloro-6-methylpyrimidine, 29.8 parts; β-piperidino-α-methylethylamine, 12.5 parts; 2-p-chlorophenylguanidino -4-β- piperidino -α- methyl-ethylamino-6-methylpyrimidine, M. P. 143°–144° C.

Example 21

2-p-chlorophenylguanidino-4-chloro-6-methylpyrimidine, 29.8 parts; γ - dibutylaminopropylamine, 22 parts; 2-p-chlorophenylguanidino-4-γ-dibutylaminopropylamino -6- methylpyrimidine, M. P. 93°–94° C.

Example 22

2 - p - chlorophenylguanidino - 4 - chloro - 6 - methylpyrimidine hydrochloride, 33.4 parts; γ-diethylaminopropylamine, 15 parts; 2-p-chlorophenylguanidine-4-γ -diethylaminopropylamino-6-methylpyrimidine, M. P. 140–141° C.

Example 23

2 - p - chlorophenylguanidino - 4 - chloro - 6 - methylpyrimidine, 29.8 parts; γ-piperidinopropylamine 22 parts; 2-p-chlorophenylguanidino-4-γ-piperidinopropylamino - 6 - methylpyrimidine, M. P. 192° C.

Example 24

2 - p - chlorophenylguanidino - 4 - chloro - 6 - methylpyrimidine, 29.8 parts; N - methyl-N-β-diethylaminoethyl-ethylene diamine, 21 parts; 2-p-chlorophenylguanidino- 4 - β-N-methyl-N-β-diethylaminoethyl) aminoethylamino-6 -methylpyrimidine, M. P. 108–109 ° C.

Example 25

2 - p - chlorophenylguanidino - 4 - chloro - 6 - methylpyrimidine, 29.8 parts; p-β-diethylaminoethylmercaptoaniline, 21 parts; 2-p-chlorophenylguanidino - 4 - (p'-β-diethylaminoethylmercaptoanilino) - 6 - methylpyrimidine, M. P. 146–147° C.

Example 26

2 - p - chlorophenylguanidino - 4 - chloro - 6 - methylpyrimidine hydrochloride, 33.4 parts; γ-dimethylaminopropylamine, 12 parts; 2-p-chlorophenylguanidino - 4 - γ -dimethylaminopropylamino-6-methylpyrimidine, M. P. 182–184° C.

Example 27

2 - p - chlorophenylguanidino - 4 - chloro - 6 - methylpyrimidine, 29.8 parts, δ-diethylaminobutylamine, 21 parts; 2-p - chlorophenylguanidino - 4 - δ-diethylaminobutylamino-6-methylpyrimidine, M. P. 125–126° C.

Example 28

2-p-nitrophenylguanidino-4 -chloro-6-methylpyrimidine, 30.8 parts; β - diethylaminoethylamine, 14 parts; 2-p-nitrophenylguanidino-4-β-diethylaminoethylamino - 6 - methylpyrimidine, M. P. 214–215° C.

Example 29

2-p-cyanophenylguanidino - 4 - chloro - 6 - methylpyrimidine, 28.8 parts; β-diethylaminoethylamine, 13 parts; 2-p-cyanophenylguanidino-4-β-diethylaminoethylamino - 6 - methylpyrimidine, M. P. 220–221° C.

Example 30

2-p-bromophenylguanidino-4-chloro -6 -methylpyrimidine hydrochloride, 37.8 parts; β-diethylamionethylamine, 14 parts; 2-p-bromophenylguanidino - 4 - β - diethylaminoethylamino - 6 - methylpyrimidine, M. P. 154–155° C.

Example 31

2-p-iodophenylguanidino-4-chloro - 6 -methylpyrimidine hydrochloride, 42.5 parts; β-diethylaminoethylamine, 17.5 parts; 2-p-iodophenylguanidino - 4 - β-diethylaminoethylamino - 6 - methylpyrimidine, M. P. 157–159° C.

Example 32

2 - p - methylmercaptophenylguanidino - 4 - chloro - 6 - methylpyrimidine, 30.9 parts; β-diethylaminoethylamine, 17 parts; 2-p-methylmercaptophenylguanidino - 4 - β - diethylaminoethylamino- 6 -methylpyrimidine, M. P. 155–157° C.

Example 33

2 - p - phenyl-phenylguanidino - 4 - chloro-6-methylpyrimidine, 33.9 parts; β-diethylaminoethylamine, 17 parts; 2-p-phenyl - phenyl - guanidino-4-β-diethylaminoethylamino-6-methylpyrimidine, M. P. 164–166° C.

Example 34

2 - phenylguanidino - 4 - chloro - 6 - methylpyrimidine hydrochloride, 29.8 parts; β-diethylaminoethylamine, 13 parts; 2-phenylguanidino-4-β-diethylaminoethylamino-6- methylpyrimidine, M. P. 119°–120° C.

Example 35

2 - p - methylsulphonylphenylguanidino - 4 - chloro - 6 - methylpyrimidine, 33.5 parts; β-diethylaminoethylamine, 20 parts; 2-p-methylsulphonylphenylguanidino - 4 - β-diethylaminoethylamino - 6 - methylpyrimidine, M. P. 152–154° C.

Example 36

2-phenylguanidino - 4 - chloro - 6 - methylpyrimidine hydrochloride, 29.8 parts; γ-diethylaminopropylamine, 18 parts; 2-phenylguanidino-4-γ-diethylaminopropylamino- 6 -methylpyrimidine, M. P. 127–128° C.

Example 37

2-p-anisylguanidino - 4 - chloro - 6 - methylpyrimidine hydrochloride, 32.9 parts; β-diethylaminoethylamine, 14 parts, 2-p-anisylguanidino-4-β-diethylaminoethylamino - 6 - methylpyrimidine, M. P. 185–186° C.

Example 38

2-p-dimethylaminosulphonyl phenylguanidino-4-chloro-6-methylpyrimidine, 37.0 parts, β-diethylaminoethylamine, 18.5 parts; 2-p-dimethylaminosulphonylphenylguanidino-4-β - diethylaminoethylamino-6-methylpyrimidine, M. P. 149°–150° C.

Example 39

2-p-dimethylaminophenylguanidino-4 - chloro-6-methylpyrimidine, 30.6 parts; β-diethylaminoethylamine, 17.6 parts; 2-p-dimethylaminophenylguanidino - 4 - β - diethylaminoethylamino - 6 - methylpyrimidine, M. P. 182°–184° C.

Example 40

2-m-chlorophenylguanidino-4-chloro-6- methylpyrimidine hydrochloride, 33.4 parts; β-diethylaminoethylamine, 18 parts; 2-m-chlorophenylguanidino-4-β-diethylaminoethylamino-6- methylpyrimidine, M. P. 149° C.

Example 41

2-(4'-chloro - 2' - methylphenylguanidino) - 4-chloro-6-methylpyrimidine, 31.2 parts; β-diethylaminoethylamine, 18 parts; 2-(4'-chloro-2'-methylphenylguanidino) -4-β-diethylaminoethylamino-6-methylpyrimidine, M. P. 138–139° C.

Example 42

2-(2':5'-dichlorophenylguanidino)-4-chloro-6-methylpyrimidine, 33.3 parts; β-dimethylaminoethylamine, 17 parts; 2-(2':5'-dichlorophenylguanidino) - 4 - β - diethylaminoethylamino - 6 - methylpyrimidine, M. P. 129°–130° C.

Example 43

2-m-tolylguanidino-2-chloro-6- methylpyrimidine hydrochloride, 31.3 parts; β-diethylaminoethylamine, 12.5 parts; 2-m-tolylguanidino-4-β-diethylaminoethylamino - 6 - methylpyrimidine, M. P. 134–135° C.

Example 44

2-(3'-chloro-5'-methoxyphenylguanidino) - 4-chloro-6-methylpyrimidine, 32.9 parts; β-diethylaminoethylamine, 18 parts; 2-(3'-chloro-5'-methoxyphenylguanidino) -4-chloro - 6 - methylpyrimidine, M. P. 145–147° C.

Example 45

2-o-chlorophenylguanidino-4-chloro-6 - methylpyrimidine hydrochloride, 33.4 parts; β-diethylaminoethylamine, 16.5 parts; 2-o-chlorophenylguanidino-4-β-diethylaminoethylamino-6-methylpyrimidine, M. P. 130° C.

Example 46

2-(3':4'-dimethylphenylguanidino)- 4 -chloro-6-methylpyrimidine hydrochloride, 32.7 parts; β-diethylaminoethylamine, 14 parts; 2-(3':4'-dimethylphenylguanidino)-4-β-diethylaminoethylamino-6-methylpyrimidine, M. P. 132–134° C.

Example 47

2-o-tolylguanidino-4-chloro- 6 - methylpyrimidine hydrochloride, 22.8 parts; β-diethylaminoethylamine, 13.9 parts; 2-o-tolylguanidino-4-β-diethylaminoethylamino- 6 - methylpyrimidine, M. P. 104–106° C.

Example 48

2-p-chlorophenylguanidino-4-chloro-5:6 - trimethylenepyrimidine, 32.4 parts; β-diethylaminoethylamine, 15 parts; 2-p-chlorophenylguanidino-4-β-diethylaminoethylamino-5:6 - trimethylenepyrimidine, M. P. 98°–102° C.

Example 49

2-p-chlorophenylguanidino-4-chloro - 5:6:7:8-tetrahydroquinazoline, 33.8 parts; β-diethylaminoethylamine, 14.5 parts; 2-p-chlorophenylguanidino-4-β-diethylaminoethylamino-5:6:7:8-tetrahydroquinazoline, M. P. 159°–160° C.

Example 50

A mixture of 33.8 parts of 2-p-chlorophenylguanidino-4 - phenoxy - 6 - methylpyrimidine, 12 parts of β-diethylaminoethylamine and 40 parts of glacial acetic acid is heated for 2 hours in an oil-bath kept at 140° C. After cooling somewhat, the still molten reaction mixture is added to 400 parts of cold water and the solution so obtained is filtered to remove a little insoluble matter. The filtrate is made strongly alkaline by adding an excess of caustic soda. The semi-solid precipitate so formed is filtered off and recrystallised from petroleum ether. It is 2-p-chlorophenylguanidino-4- β - diethylaminoethylamino-6-methylpyrimidine. It forms colourless crystals which melt at 154–155° C.

The 2-p-chlorophenylguanidino-4-phenoxy-6-methylpyrimidine used as starting material in the above example is made by heating the corresponding 4-chloropyrimidine (see specification No. 15972/43) with sodium phenate in phenol solution at 130° C. for 1 hour. When recrystallised from butyl alcohol it melts at 187°–188° C, uncorr.

Example 51

A mixture of 30.6 parts of 2-p-chlorophenylguanidino - 4 - ethoxy-6-methylpyrimidine, 30 parts of β-diethylaminoethylamine and 40 parts of glacial acetic acid is heated for 2 hours in an oil-bath kept at 110–120° C. After cooling, the still molten reaction mixture is added to 400 parts of cold water and made acid to Congo red by the addition of hydrochloric acid of 36% strength. Any unchanged 2-p-chlorophenylguanidino-4-ethoxy-6-methylpyrimidine is precipitated as the sparingly soluble hydrochloride and is filtered off. The filtrate is made strongly alkaline by adding an excess of caustic soda. The semi-solid precipitate is washed with water by decantation and recrystallised from petroleum ether. The product is 2-p-chlorophenylguanidino-4 - β - diethylaminoethylamino-6-methylpyrimidine. When pure it forms colourless crystals which melt at 154–155° C.

The 2 - p-chlorophenylguanidino-4-ethoxy-6-methylpyrimidine used as starting material in the above example is made by heating the corresponding 4-chloropyrimidine with sodium ethoxide in dry ethyl alcohol. When recrystallised from ethyl alcohol it melts at 149–150° C.

*Example 52*

A mixture of 30.8 parts of 2-p-chlorophenylguanidino - 4 - methylmercapto-6-methylpyrimidine, 13 parts of β-diethylaminoethylamine and 12 parts of glacial acetic acid is heated in a boiling water bath for 2 hours. Reaction occurs and methyl mercaptan is given off. The resulting solution is diluted with 120 parts of cold water and the mixture made acid to Congo red by adding hydrochloric acid of 36% strength. Any unchanged 2-p-chlorophenylguanidino-4-methylmercapto-6-methylpyrimidine separates out in the form of the sparingly soluble hydrochloride and is filtered off. The filtrate is made strongly alkaline by adding an excess of caustic soda. The semi-solid precipitate is washed with water by decantation and dried in vacuo over solid caustic potash. The dry product is recrystallised from acetone. It is 2-p-chlorophenylguanidino - 4 - β - diethylaminoethylamino-6-methylpyrimidine and melts at 154–155° C.

The 2 - p - chlorophenylguanidino-4-methylmercapto-6-methylpyrimidine used as starting material in the above example is made by heating the corresponding 4-chloropyrimidine with sodium methylmercaptide in boiling methyl alcohol solution. It can be recrystallised from aqueous methanol, when it forms colourless prisms which melt at 147–149° C. uncorr.

In some cases the substituent on the aryl radical of the final 4-basically-substituted 2-arylguanidinopyrimidine can be quite simply chemically modified to produce other compounds coming within the general formula given above and active as parasiticidal agents. Thus, for instance, 2 - p - nitrophenylguanidino-4-β-diethylaminoethylamino-6-methylpyrimidine is readily hydrogenated in methanol in presence of a Raney nickel catalyst to yield the corresponding amino compound M. P. 143–144° C.

Likewise the terminal amino group of the basic 4-substituent may be modified to produce other compounds coming within the general formula given above and active as parasiticidal agents. For instance, in those cases where the 4-substituent has a terminal primary amino group it may be mono- and di-alkylated or converted to piperidino, pyrrolidino or other strongly basic nitrogen-containing heterocyclic group, or where it has a terminal monoalkylamino group that may be converted to a dialkylamino group.

Whereas the above description and examples illustrate many widely varied embodiments of the invention, it will be apparent to one skilled in the art that many other embodiments and variations may be devised without departing from the spirit and scope thereof and accordingly it is to be understood that the invention is not in any way limited except as defined in the following claims.

We claim:

1. As new compounds, the free base form and salts of the pyrimidine derivatives of the formula—

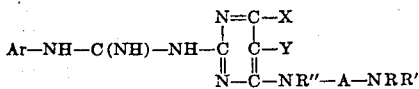

wherein Ar is an aromatic radical having not more than 10 carbon atoms in its cyclic skeleton and having its extranuclear valencies satisfied by attachment to members selected from the group consisting of hydrogen, alkyl, phenyl, alkyloxy, halogen, nitro and cyano; the pair of symbols X and Y represent substituents selected from the following group namely: (a) a single divalent aliphatic hydrocarbon radical which forms with 5- and 6-carbon atoms an alicyclic ring, (b) two hydrocarbon radicals, (c) one hydrocarbon radical and one hydrogen atom, and (d) two hydrogen atoms; R'' is a member of the group consisting of hydrogen, alkyl, alkoxyalkyl and dialkylaminoalkyl; A is a linking radical selected from the group consisting of aliphatic, alicyclic and aliphatic-carbocyclic radicals; and NRR' represent a basic radical selected from the group consisting of primary, secondary and tertiary amines and heterocyclic nitrogenous bases.

2. Process for the manufacture of pyrimidine compounds as defined in claim 1, which comprises reacting a diamine of the form NHR''—A—NRR', as defined below, with a 2-arylguanidino-pyrimidine of the formula

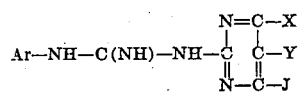

wherein J designates a labile substituent selected from the group consisting of halogen, alkoxy, aryloxy and alkylmercapto, Ar is an aromatic radical having not more than 10 carbon atoms in its cyclic skeleton and having its extranuclear valencies satisfied by attachment to members selected from the group consisting of hydrogen, alkyl, phenyl, alkyloxy, halogen, nitro and cyano; the pair of symbols X and Y represent substituents selected from the following group, namely: (a) a single divalent aliphatic hydrocarbon radical which forms with 5- and 6-carbon atoms an alicyclic ring, (b) two hydrocarbon radicals, (c) one hydrocarbon radical and one hydrogen atom, and (d) two hydrogen atoms; R'' is a member of the group consisting of hydrogen, alkyl, alkoxyalkyl and dialkylaminoalkyl; A is a linking radical selected from the group consisting of aliphatic, alicyclic and aliphatic-carbocyclic radicals; and NRR' represents a basic radical selected from the group consisting of primary, secondary and tertiary amines and heterocyclic nitrogeneous bases.

3. As new compounds, the free base form and salts of the pyrimidine derivatives of the formula

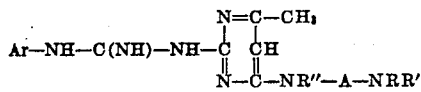

wherein Ar is an aromatic radical having not more than 10 carbon atoms in its cyclic skeleton and having its extranuclear valencies satisfied by attachment to members selected from the group consisting of hydrogen, alkyl, phenyl, alkyloxy, halogen, nitro and cyano; R'' is a member of the group consisting of hydrogen, alkyl, alkoxyalkyl and dialkylaminoalkyl; A is a linking radical selected from the group consisting of aliphatic, alicyclic and aliphatic-carbocyclic radicals; and NRR' represents a basic radical selected from the group consisting of primary, secondary and tertiary amines and heterocyclic nitrogenous bases.

4. As new compounds, the free base form and salts of the pyrimidine derivatives of the formula

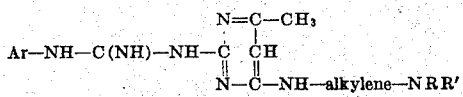

wherein Ar is an aromatic radical having not more than 10 carbon atoms in its cyclic skeleton and having its extranuclear valencies satisfied by attachment to members selected from the group consisting of hydrogen, alkyl, phenyl, alkyloxy, halogen, nitro and cyano, and NRR' represents a basic radical selected from the group consisting of primary, secondary and tertiary amines and heterocyclic nitrogenous bases.

5. As new compounds, the free base form and salts of the pyrimidine derivatives of the formula

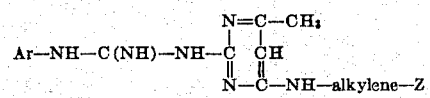

wherein Ar is an aromatic radical having not more than 10 carbon atoms in its cyclic skeleton and having its extranuclear valencies satisfied by attachment to members selected from the group consisting of hydrogen, alkyl, phenyl, alkyloxy, halogen, nitro and cyano, and wherein Z designates the radical of a dialkyl amine attached at its N-atom.

6. As new compounds, the free base form and salts of the pyrimidine derivatives of the formula

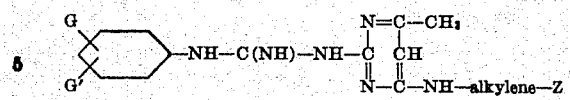

wherein G and G' represent monovalent substituents of the group consisting of hydrogen, halogen, nitro, alkyl, alkoxy, phenyl, and cyano, while Z designates the radical of a dialkyl amine attached at its N-atom.

7. A compound selected from the group consisting of the free base form and salts of 2-p-chlorophenyl - guanidino-6-methyl-4-($\beta$-diethylaminoethylamino)-pyrimidine.

8. A compound selected from the group consisting of the free base form and salts of 2-p-nitrophenyl - guanidino-6-methyl-4-($\beta$-diethylaminoethylamino)-pyrimidine.

9. A compound selected from the group consisting of the free base form and salts of 2-p-cyanophenyl - guanidino-6-methyl-4-($\beta$-diethylaminoethylamino)-pyrimidine.

10. Process for the manufacture of pyrimidine compounds as defined in claim 5, which comprises reacting the corresponding 2-arylguanidino-4-halogeno-6-methyl-pyrimidine with an alkylene diamine of formula $NH_2$—alkylene—Z, wherein Z designates the radical of a dialkyl amine attached at its N-atom.

FRANCIS HENRY SWINDEN CURD.
FRANCIS LESLIE ROSE.